United States Patent
Wilson

(10) Patent No.: US 7,085,089 B2
(45) Date of Patent: Aug. 1, 2006

(54) SYSTEM AND METHOD FOR REDUCING CIRCUMFERENTIAL TRANSITION INCOHERENCE IN SERVOWRITING OPERATIONS AND MAGNETIC DISK DRIVE INCORPORATING THE SAME

(75) Inventor: Ross S. Wilson, Menlo Park, CA (US)

(73) Assignee: Agere Systems Inc., Allentown, PA (US)

( * ) Notice: Subject to any disclaimer, the term of this patent is extended or adjusted under 35 U.S.C. 154(b) by 255 days.

(21) Appl. No.: 10/404,828

(22) Filed: Apr. 1, 2003

(65) Prior Publication Data
US 2004/0196584 A1    Oct. 7, 2004

(51) Int. Cl.
G11B 5/02 (2006.01)
G11B 21/02 (2006.01)
(52) U.S. Cl. .......................................... 360/67; 360/75
(58) Field of Classification Search ................ 327/108, 327/110; 360/60, 67, 68, 75
See application file for complete search history.

(56) References Cited

U.S. PATENT DOCUMENTS

| | | | | |
|---|---|---|---|---|
| 5,247,398 A * | 9/1993 | Sidman | ........................ | 360/75 |
| 5,570,241 A * | 10/1996 | Nielsen et al. | ................. | 360/68 |
| 5,574,702 A * | 11/1996 | Ishii | ............................. | 360/46 |
| 5,612,828 A * | 3/1997 | Brannon et al. | ............... | 360/68 |
| 6,583,946 B1 * | 6/2003 | Emerson | ....................... | 360/66 |
| 6,624,957 B1 * | 9/2003 | Yun | ............................ | 360/66 |
| 6,687,064 B1 * | 2/2004 | Jiang et al. | .................... | 360/68 |

* cited by examiner

*Primary Examiner*—Wayne Young
*Assistant Examiner*—Glenda P. Rodriguez

(57) ABSTRACT

For use with a servowriter that includes a writer core having a plurality of transistors that route servowriting current in response to a servo write signal, a write transition controller, a method of operating the same and a magnetic disk drive incorporating the controller or the method. In one embodiment, the controller includes: (1) logic circuitry, coupled to the writer core, that selectively blocks the servo write signal based on a state of a write current control signal and (2) current shunt circuitry, coupled to the writer core, that operates concurrently with the logic circuitry selectively to shunt current around the writer core based on the state.

20 Claims, 4 Drawing Sheets

SYSTEM AND METHOD FOR REDUCING CIRCUMFERENTIAL TRANSITION INCOHERENCE IN SERVOWRITING OPERATIONS AND MAGNETIC DISK DRIVE INCORPORATING THE SAME

TECHNICAL FIELD OF THE INVENTION

The present invention is directed, in general, to magnetic disk drives and, more specifically, to a system and method for reducing circumferential transition incoherence in servowriting operations and a magnetic disk drive incorporating the system or the method.

BACKGROUND OF THE INVENTION

Magnetic disk drives are commonly employed in a variety of applications to store user data in a form that is substantially permanent. They employ magnetic disks or platters to magnetically record such data. Servo patterns are pre-written on the magnetic platter to define track positions and allow selection of a particular section of a track by a read/write head, which is part of a voicecoil actuator assembly. The read/write head is employed initially to write and then read the data, on request. As magnetic disk drive data densities increase, the writing of reliable servo patterns becomes increasingly more important.

Servo patterns commonly contain radial transitions of length greater than the width of the writing head. Current methods of writing servo patterns write long radial transitions as an abutment of multiple shorter radial segments. Each shorter segment is written on a separate pass, or disk revolution. Timing of the write operation is derived from a common phase-locked oscillator synchronized to a clock track prerecorded on the disk or, in the case of 'self-servowriting' technology, to a fiducial pattern bootstrapped onto the disc by iterative writing by the drive itself.

During currently practiced methods of servowriting, a write head (which commonly is the same head as is used to write user data), is stepped at half servo track pitches, the goal being to provide transitions which radially span two or more adjacent tracks. Typically, a servo track pitch is approximately the width of the recording head. Because quadrature servo position error information is desired on playback, in order to obtain a continuous representation of head position, it is necessary to write track-pitch-long radial transitions both at servo track boundaries, and radially displaced therefrom by half a track width. Presently, these transitions are written in multiple independent passes and are trimmed at a radial midpoint, a strategy imposed by the inability of present writer designs rapidly to toggle write head current in timeframes substantially less than a servo transition interval.

This multi-pass writing approach is a likely source of incoherence, since perfect circumferential transition alignment is typically not achieved owing to mechanical vibration in the head/gimbal assembly and to time jitter in the clock reference source. At high areal densities, transition circumferential incoherence causes a reduction in a signal-to-noise ratio (SNR) associated with servo pattern reading due to edge effects at the transition abutment points. This reduced SNR results in potential read/write head mis-positioning and mis-detection of track address information.

Further, previously written servo pattern transitions often suffer partial erasure effects at the abutment points during servowriting, thereby causing further signal degradation and SNR reduction. These partial erasure effects produce imperfections that increase position error signal modulation leading to reduced tracking accuracy. Additionally, write head drivers embodied in conventional read/write preamplifiers typically have a long write current turn-on and turn-off time compared to the write current transition time. This characteristic prohibits powering the write amplifier on and off quickly enough, especially at high areal densities, to prevent these partial erasure effects. Conventional preamplifiers use a common writer for both data and servo pattern writing functions; power is typically conserved in these designs by switching the writer current source itself, a slow operation owing to significant amount of precision low-speed analog circuitry in the current source. It may be appreciated that the ability to pre-record servo information having sufficient quality presents a major problem area to increasing disk drive performance and increasingly higher servo transition frequencies.

Accordingly, what is needed in the art is a way to reduce incoherence caused by a multiple-pass, independent writing of servo patterns that typically produces an area of circumferential transition misalignment and edge effects between servo pattern half-tracks.

SUMMARY OF THE INVENTION

To address the above-discussed deficiencies of the prior art, the present invention introduces, for use with a servowriter that includes a writer core having a plurality of transistors that route servowriting current in response to a servo write signal, a write transition controller, a method of operating the same and a magnetic disk drive incorporating the controller or the method. In one embodiment, the controller includes: (1) logic circuitry, coupled to the writer core, that selectively blocks the servo write signal based on a state of a write current control signal and (2) current shunt circuitry, coupled to the writer core, that operates concurrently with the logic circuitry selectively to shunt current around the writer core based on the state.

In another aspect, the present invention provides a method of controlling write transitions for use with a servowriter that includes a writer core having a plurality of transistors that route servowriting current in response to a servo write signal. The method includes selectively blocking the servo write signal based on a state of a write current control signal and concurrently selectively shunting current around the writer core based on the state.

The present invention also provides, in yet another aspect, a magnetic disk drive. The magnetic disk drive employs a magnetic recording disk and a voicecoil read/write head proximate the magnetic recording disk. The magnetic disk drive also employs read/write circuitry, coupled to the voicecoil read/write head, that includes a servowriter, having a writer core with a plurality of transistors, that routes servowriting current in response to a servo write signal. The magnetic disk drive further includes logic circuitry, coupled to the writer core, that selectively blocks the servo write signal based on a state of a write current control signal, and current shunt circuitry, coupled to the writer core, that operates concurrently with the logic circuitry selectively to shunt current around the writer core based on the state.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figures 1A, 1B:
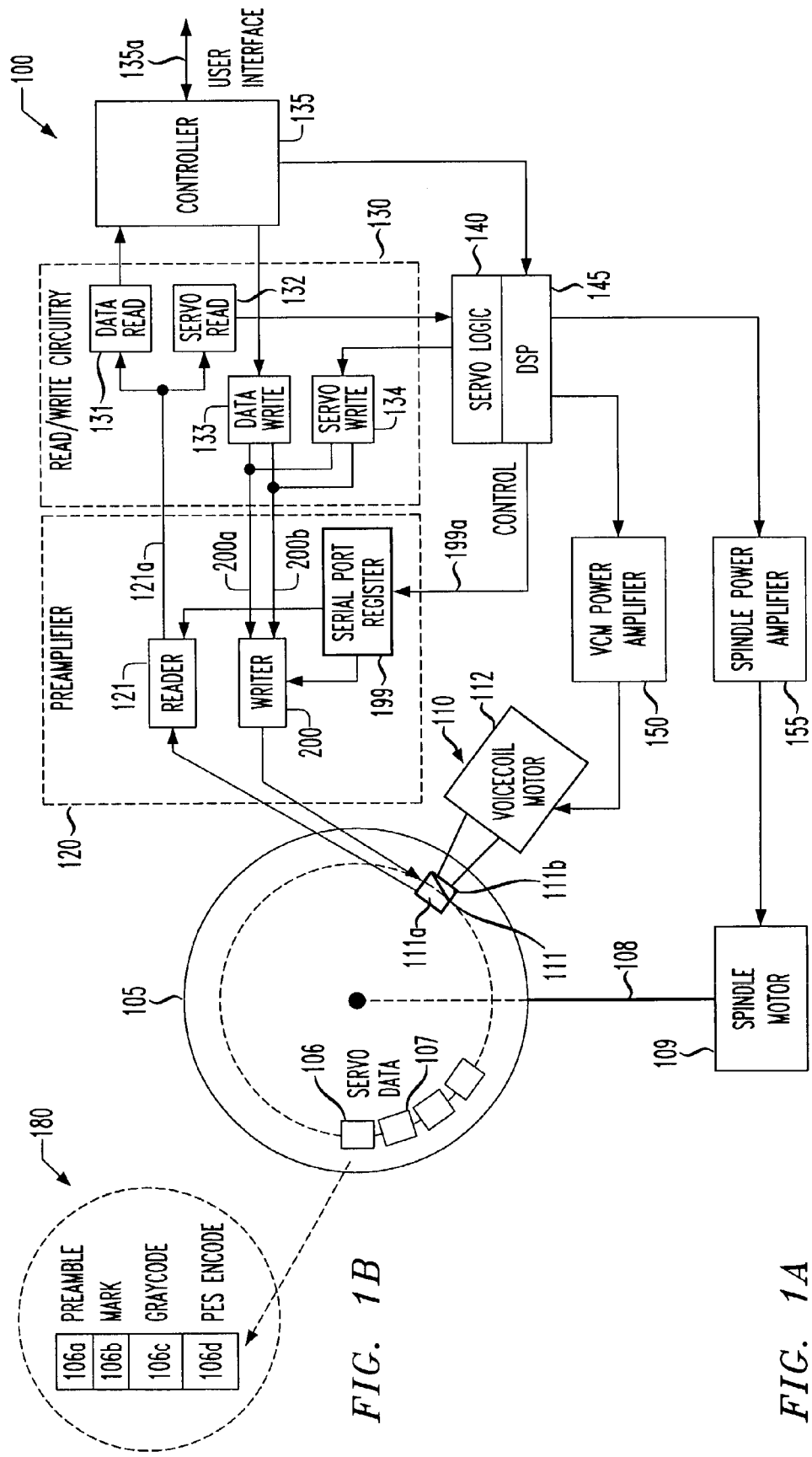
FIG. 1A illustrates a diagram of an embodiment of a magnetic disk drive constructed in accordance with the principles of the present invention.
FIG. 1B illustrates a diagram of an embodiment of a servo information format that may be employed in the servo information of FIG. 1A.

Referring initially to FIG. 1A, illustrated is a diagram of an embodiment of a magnetic disk drive, generally designated 100, constructed in accordance with the principles of the present invention. The magnetic disk drive 100 includes a magnetic recording disk (i.e., magnetic platter) 105 containing a servo pattern 106 and user data 107, a spindle 108 and a spindle motor 109. The magnetic disk drive 100 also includes a voicecoil actuator assembly 110, read/write circuitry 130, a controller 135 coupled to user interface 135a, a servo logic 140, a digital signal processor (DSP) 145, a voice coil motor (VCM) power amplifier 150 and a spindle power amplifier 155.

The actuator assembly 110 includes a read/write head 111 mechanically coupled to a voicecoil motor 112. The preamplifier 120 includes a reader 121, a writer 200 and a serial port register 199. A read circuit 131, a servo read circuit 132, a data write circuit 133 and a servo write circuit 134 all translate and demodulate servo and data information.

The magnetic recording disk 105 is coupled to the spindle 108, which is rotated by the spindle motor 109 to maintain a spindle speed of approximately 10,000 RPM, in the illustrated embodiment. The spindle motor 109 is powered by the spindle power amplifier 155, which receives control commands from the DSP 145. The magnetic recording disk 105 typically contains a plurality of concentric tracks, which provide alternating sequences of a burst of servo information and a burst of user data wherein the servo information 106 and the user data 107 may be regarded as typical. In the magnetic disk drive 100, track densities of at least 80,000 tracks per radial inch may be attained. The reader 121 and the data read circuit 131 provide user data to controller 135 when the user data 107 are being read. Similarly, the data write circuit 133 receives data from the controller 135 when the user data 107 are being written. In data write and read operations, user data originate in, and are supplied to, user interface 135a. Controller 135 formats and introduces control and error correction information to data conveyed on user interface 135a prior to recording or playing back these data 107.

Servo bursts 106 may occur at a density of approximately 200 bursts per track, may be equally spaced circumferentially along each track and may occupy radially contiguous locations across the magnetic recording disk 105. Servo bursts provide feedback to allow the position of read/write head 111 to be regulated accurately in following a specified track (i.e., track-following) and in moving rapidly between tracks (i.e., track-accessing). The servo information 106 may be recorded at the time of manufacture of the magnetic desk drive 100 using servowriter apparatus, or it may be recorded using self-servowrite techniques, as an application may dictate.

Turning momentarily to FIG. 1B, illustrated is a diagram of an embodiment of a servo information format, generally designated 180, that may be employed in the servo information 106 of FIG. 1A. The servo information format 180 includes a servo preamble 106a, a servo mark 106b, a graycode field 106c and an encode field 106d. The servo preamble 106a provides a constant tone that allows the servo read circuit 132 to lock onto a servo burst. The servo mark 106b typically denotes an onset of information within the servo burst. The graycode field 106c and the PES (position error signal) encode field 106d respectively represent coarse and fine servo information, which allows a determination of head position to within a small fraction of a track pitch. The graycode field 106c may also contain circumferential encoding information, such as an index point, to identify the starting position of a track.

Referring again to FIG. 1A, the preamplifier 120 employs separate reader 121 and writer 200 portions, according to accepted practice. Effectively, a copy of each of these sections is provided in the preamplifier, for each head of a multiple-head disc drive. A serial port 199 contains registers which establish preamplifier operating state and parameters, and receive setup instructions from DSP 145 over serial port wires 199a. Write data lines 200a deliver user data or servo pattern write data to preamplifier 120 during write operations. Write gate line 200b puts the preamplifier into write mode. The read/write head 111, which may be of magnetoresistive construction, reads the servo information 106 through read element 111a and passes the resulting low-level signal to the preamplifier 120 where it is amplified by the reader 121 and provided to the servo read circuit 132 over read data lines 121a for further processing. Due to the low-level and high frequency nature of the signal involved, the preamplifier 120 may be mounted in proximity to the read/write head 111, typically on an associated flex-circuit.

The servo logic 140 receives processed and demodulated servo information from the servo read circuit 132 and translates this information into a format acceptable to the DSP 145. The DSP 145 executes servo control algorithms to regulate spindle speed and also to direct head position and movement according to head location commands received from the head controller 135. The processed head location commands from the DSP 145 are provided to the VCM power amplifier 150. The VCM power amplifier 150 in turn actuates the voicecoil motor 112 to position the read/write head 111 in closed-loop fashion, thereby obtaining a desired position on the magnetic recording disk 105.

In the illustrated embodiment, recording of the servo information 106 employs a preamplifier 120 with a writer 200 constructed according to the principles of the present invention, and coupled to the write element 111b of read/ write head 111. Portions of the preamplifier 120 pertinent to the present discussion include the writer 200 and the serial port register 199. The writer 200 employs a plurality of transistors (not illustrated) in a writer core 122 that route head current in response to a write gate signal 200b and write data signal 200a. The writer 200 also includes logic circuitry, coupled to the writer core 122, that selectively processes the write gate signal 200b during servo writing, based on the state of serial port register 199. The writer 200 also includes current shunt circuitry, coupled to the writer i.e., that operates concurrently with the logic circuitry selectively to shunt current around the i.e. of writer 200, based on the output of the logic circuitry. Although it is possible to record servo information using external instrumentation (a servowriter), it may be preferable to allow the magnetic disk drive 100 to servo write the servo information 106. Accordingly, the DSP 145 may employ a required software to accomplish this task, known as "self servowriting." Servo write logic 134 is coupled to the servo logic 140 and controls the preamplifier 120 during servo writing operations through write data lines 200a and write gate lines 200b.

Figure 2:
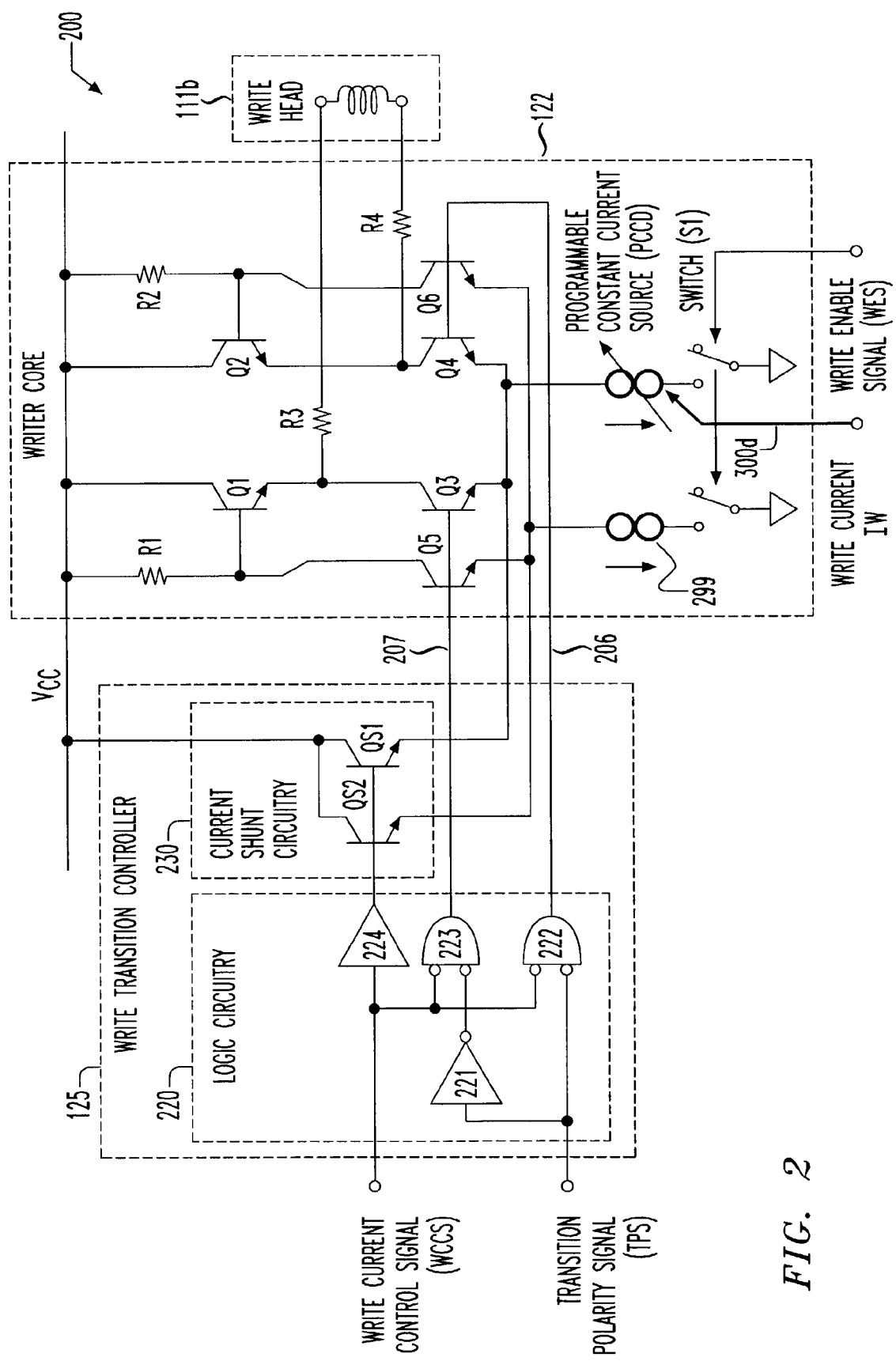
FIG. 2 illustrates a schematic diagram of an embodiment of write portions of a preamplifier constructed in accordance with the principles of the present invention.

Turning now to FIG. 2, illustrated is a schematic diagram of an embodiment of preamplifier write circuits as modified to support servo pattern writing according to the present invention. These writer circuits, generally designated 200, constructed in accordance with the principles of the present invention, correspond to like-numbered blocks in FIG. 1A. Circuits 200 include the writer core 122, a write head element 111b as may be associated with a read/write head and a write transition controller 125. The write transition controller 125 includes a logic circuitry 220 and a current shunt circuitry 230. In the illustrated embodiment, the writer core 122 and the write transition controller 125 are co-located on a common integrated circuit substrate which typically is shared with other preamplifier circuits. In an alternative embodiment, they may be discrete entities.

The writer core 122 includes first and second pull-up resistors R1, R2, first, second, third, fourth, fifth and sixth writer transistors Q1, Q2, Q3, Q4, Q5, Q6, a programmable constant current device PCCD and a switch S1 which is coupled to the programmable constant current source PCCD and adapted to receive a write enable signal WES. A current source device 299 is also included to bias the transistors Q5 and Q6, and is switched in harmony with PCCD using a series switch. Devices PCCD and 299 are shown for clarity as a combined switch and constant-current source; in practice, the two functions are merged into a single digitally controlled current source typically having comparatively slow response time to WES. Resistors R3, R4 may optionally be included to provide termination for a transmission line between write head 111b and writer core 122. Current sources PCCD and 299 are turned on when the associated switches are closed and WES is at a high level. The magnitude of servo pattern and data write current Iw is established by a bus 300d from a serial port line 299. The logic circuitry 220 employs logic elements including an inverter 221, first and second NOR gates 222, 223 and a non-inverting buffer gate 224 for amplifying and level shifting a write current control signal WCCS. The current shunt circuitry 230 includes first and second shunt transistors QS1, QS2.

In the illustrated embodiment, the writer core 122 employs a plurality of transistors (not separately referenced) that route servo writing current through the write head 111b in response to a transition polarity signal (TPS). The logic circuitry 220, which is coupled to the writer core 122, selectively blocks the TPS based on a state of the WCCS. Additionally, the current shunt circuitry 230, which is also coupled to the writer core 122, operates concurrently with the logic circuitry 220 selectively to shunt current around the writer core 122, based on the state of the WCCS. The aggregate effect of these operations is that when WCCS is asserted high, current is diverted out of write head 111b in a rapid manner and shunted to Vcc, with speed commensurate with that of normal current switching in bipolar transistors Q3 and Q4, and a small fraction of servo pattern inter-transition period. Presence of current shunt circuitry 230 and logic 125 differentiates writer 200 from conventional designs known to those skilled in the art. Conventional writers turn off write current in the head 111b by turning off PCCD. This is a slow operation, typically requiring many bit periods, hence making it an unsuitable technique for current control at bit rate speeds. The present invention maintains PCCD on throughout the servowriting operation, and relies on current steering through current shunt circuit 230 rapidly to turn off or turn on write head current. The penalty for doing this is increased power dissipation in idle areas, however as servo pattern writing is practiced in a factory environment, increased power is no liability.

When servo information is being recorded during the process of servowriting, the writer core 122 provides either a north-oriented current flow, an opposite south-oriented current flow or a condition of no current flow through the write head 111b. In the logic circuitry 220, the first NOR gate 222 has an output coupled to a first input 206 of the writer core 122 and the second NOR gate 223 has an output coupled to a second input 207 of the writer core 205. The first and second NOR gates 222, 223 are adapted to receive the transition polarity signal TPS and the WCCS to accomplish the conditions of north-oriented, south-oriented or no current flow through the write head 111b.

During servowriting, WES is continually asserted high, thus enabling PCCD to sink write current. When WCCS is asserted low, TPS controls the direction of current flow through the write head 111b, depending on its assertion state. When WCCS is high, no head current flows.

For a low state of TPS, the first gate 222 is asserted high and the second gate 223 is asserted low, since the inverter 221 provides an inverted form or high assertion level of TPS. This condition allows only the first, fourth and sixth writer transistors Q1, Q4, Q6 to conduct and provides a north-oriented current flow through the write head 111b. Alternately, for a high state of the TPS, the first gate 222 is asserted low and the second gate 223 is asserted high. This condition allows only the second, third and fifth writer transistors Q2, Q3, Q5 to conduct and provides an opposite south-oriented current flow through the write head 111b. The first and second shunt transistors QS1, QS2 are in a non-shunting mode of operation for this low assertion state of WCCS.

When WCCS is in a high assertion state, both the first and second gates 222, 223 are asserted low regardless of the assertion state of TPS. Additionally, the first and second shunt transistors QS1, QS2 are in a shunting mode of operation. This condition supplies all of the current required by the PCCD and causes the third, fourth, fifth and sixth writer transistors Q3, Q4, Q5, Q6 to be non-conducting thereby allowing no current to flow through the write head 111b.

Contrariwise, when user data are being recorded, writer core 122 operates in conventional manner, with current shunt controller 230 and associated logic playing no role. Accordingly, write current in the head is toggled on and off by toggling WES. WCCS is held fixed at a low polarity; and TPS controls writing polarity. This mode corresponds to conventional preamplifier functionality.

Figure 3:
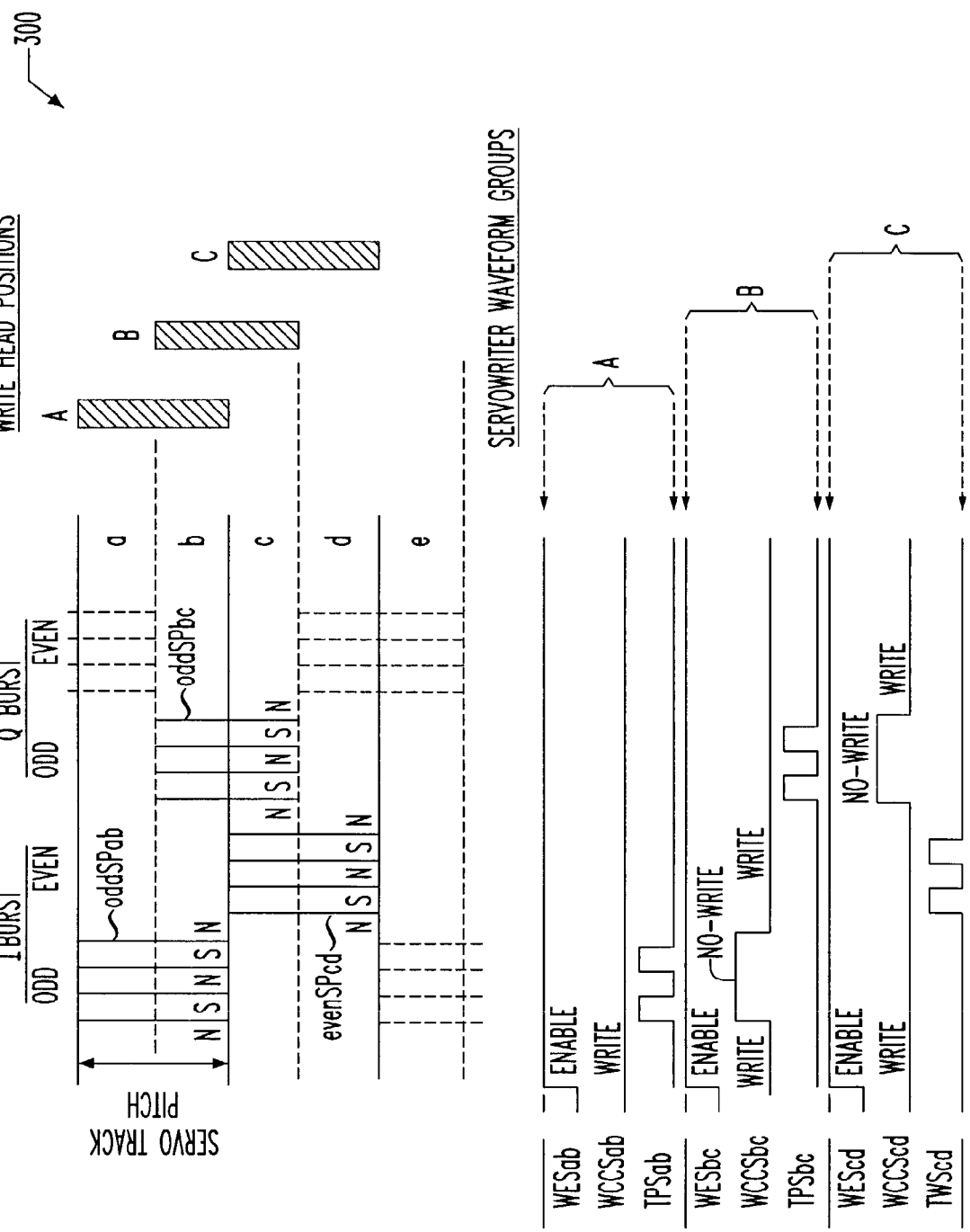
FIG. 3 illustrates a timing diagram depicting a method of controlling write transitions, showing servo patterns and corresponding waveforms associated with the servowriting process practiced in accordance with the principles of the present invention.

Turning now to FIG. 3, illustrated is an embodiment of a timing diagram, generally designated 300, depicting a method of controlling write transitions, as may be associated with the servowriting process in accordance with the principles of the present invention. Servo patterns and corresponding waveforms are illustrated. The timing diagram 300 includes first, second and third write head positions A, B, C associated with a write head on a magnetic recording disk, first, second, third, fourth and fifth half-track positions a, b, c, d, e on the magnetic recording disk and exemplary first, second and third servo patterns oddSPab, oddSPbc, evenSPcd recorded by the write head in an accepted quadrature Iburst/Qburst format. This format produces upon demodulation two quadrature PES signals, I and Q, by differencing for each PES signal the associated odd and even bursts. It will be appreciated that other PES encodements exist that will benefit from the described method of servo writing. The timing diagram 300 also includes first, second and third waveform groups A, B, C associated with the first, second and third write head positions A, B, C, respectively. Each of the waveform groups A, B, C includes a high-true (high to allow write current flow) WES, a low-true (low to allow write current flow) WCCS and a TPS.

Each of the first, second and third waveforms A, B, C includes waveform polarities as may be associated with the servo writing circuitry 200 discussed with respect to FIG. 2. In all waveform groups, signals WESab, WESbc, WEScd are maintained high (asserted) throughout the writing process, thus continually enabling the PCCD and allowing the WCCS signals to control write current flow in the head in a fast manner. The first waveform, group A, maintains a low assertion state for a first write current control signal WCCSab that enables servowriting. A first transition polarity signal TPSab may be employed to create the first servo pattern oddSPab that spans the first and second half-track positions a, b, as shown.

The second waveform, group B, employs a second WCCS, WCCSbc, with a low assertion state that enables head current flow where WCCSbc is low. A high state on WCCSbc, at the position shown, preserves intact the servo pattern oddSPab written at waveform group A by selectively blocking head current flow at this time. The second servo pattern oddSPbc is created by SWSbc, as shown.

In the illustrated embodiment, this process of servowriting continues for the third waveform group C wherein the first and second servo patterns oddSPab, oddSPbc are preserved intact and not overwritten, and the third servo pattern evenSPcd is created. The first servo pattern oddSPab is preserved since the third write head position C does not affect the first and second half-track positions a, b. Additionally, a high state for the third WCCS, WCCScd, at the position shown, preserves the second servo pattern oddSPbc by inhibiting additional writing there. This process may be considered exemplary of the creation of all required servo patterns associated with the magnetic recording disk being employed. The continuity of each of the first, second and third servo patterns oddSPab, oddSPbc, evenSPcd across their respective half-track positions may typically increase an associated signal to noise ratio of a servo read signal for these servo patterns. Additionally, a misalignment jitter between appropriate half-track positions may be reduced. These attributes typically provide an improvement in servo positioning capability or quality.

While the illustrated timing diagram depicting the method disclosed herein has been described and shown with reference to particular waveforms or steps performed in a particular order, it will be understood that these waveforms or steps may be altered, supplemented or reordered to form an equivalent method without departing from the teachings of the present invention. Accordingly, unless specifically indicated herein, the order and/or the grouping of the waveforms or steps are not limitations of the present invention, nor are their applications to other servo encoding formats, of which the so-called "null PES" format is but one example.

Figure 4:
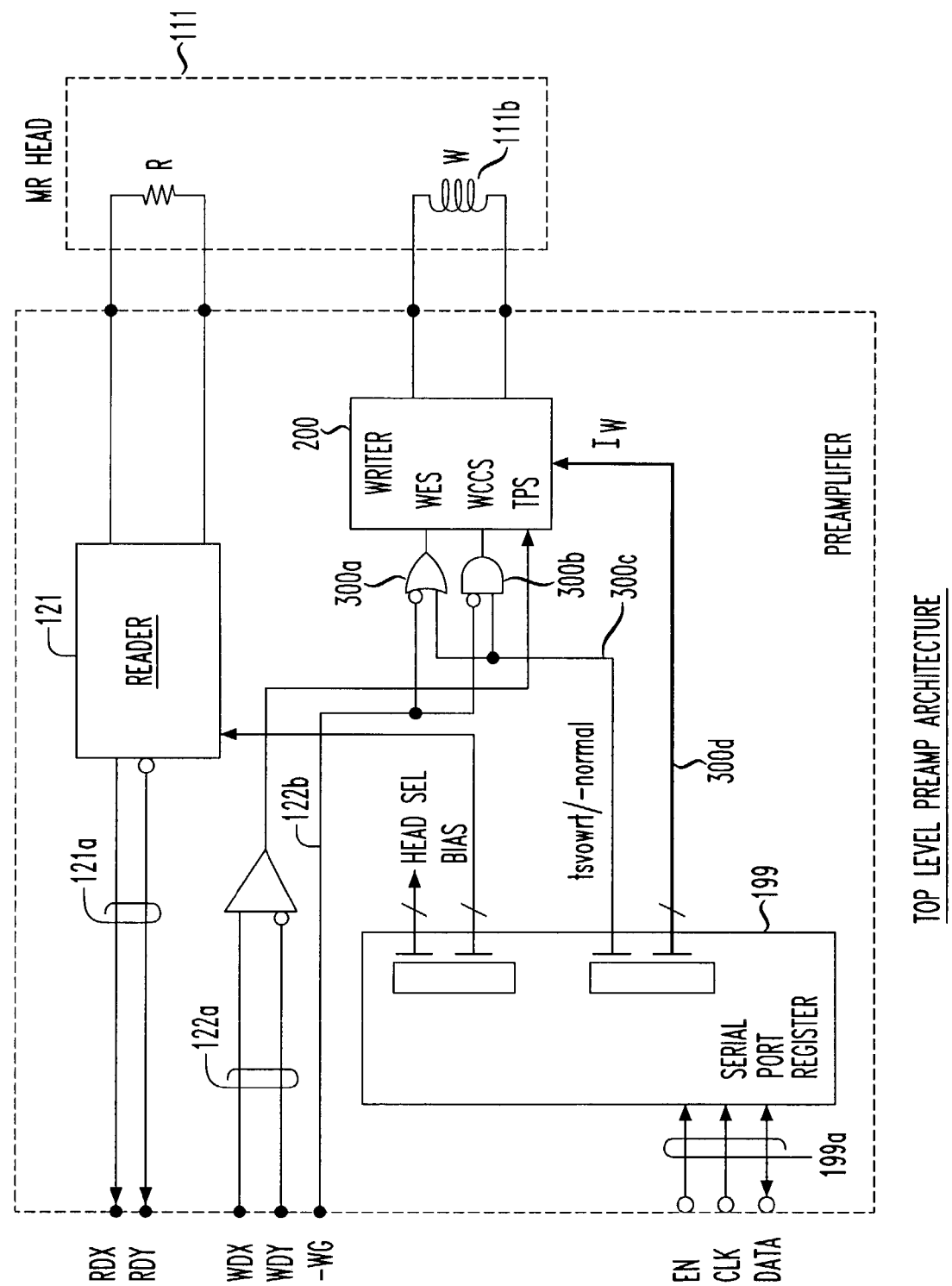
FIG. 4 illustrates how the concepts of the present invention may be integrated into a disc drive preamplifier integrated circuit.

Referring now to FIG. 4, a method of incorporating the writer described in FIG. 2 into a preamplifier is illustrated. A serial port register 199, a serial port interface 199a, a reader 121, read data lines 121a, a head 111, write data lines 122a and a write enable line 122b all correspond to like-numbered items in FIG. 1. Similarly, writer 200 corresponds to item 200 in FIG. 2. In servo write mode, a wire 300c originating in a register bit within the serial port register 199 is asserted high under influence of the serial port and DSP software. This enables a gate 300b to pass the (negative true) write gate line 122b directly (after inversion) to WCCS, to control rapid initiation and cessation of current flow in the write head 111b. Similarly, the gate 300a is forced to deliver a continuously high output, thus continually enabling current source PCCD. Under these conditions, the servo writing mode of the present invention is exercised.

If the wire 300c and associated bit in the serial port register is made low, thus commanding conventional data-writing mode in the preamplifier, WCCS is forced low at the gate 300b, thus disabling current shunt circuitry 230, and WES will be gated through the gate 300a to track the inverted state of the write gate line 122b. In this mode, as explained previously, write current shutoff/turnon in the head 111 is accomplished by toggling current source PCCD, a process that can occupy many bit cell times due to slow action of current source PCCD.

In both modes, servo write and data write, write current magnitude is programmed into the serial port register 199 and conveyed over a bus 300d to current source PCCD to control current magnitude thereof.

In summary, embodiments of circuitry to write servo information and a method of controlling write transitions that may be associated with a magnetic disk drive have been presented. These embodiments enable two preamplifier operational modes. In the servo writing mode, single-pass writing of servo patterns associated with two half-track positions that are preserved when exposed in subsequent servowriting passes by employing a fast-responding write current control signal to protect them. In its normal operational mode, conventional data writing capabilities of the preamplifier are preserved, including power reduction when no write operation is in progress.

Although the present invention has been described in detail, those skilled in the art should understand that they can make various changes, substitutions and alterations herein without departing from the spirit and scope of the invention in its broadest form.

What is claimed is:

1. For use with a servowriter that includes a writer core having a plurality of transistors that route servowriting current in response to a servo write signal, a write transition controller, comprising:

logic circuitry, coupled to said writer core, that selectively blocks said servo write signal based on a state of a write current control signal; and current shunt circuitry, coupled to said writer core, that operates concurrently with said logic circuitry selectively to shunt current around said writer core based on said state.

2. The controller as recited in claim 1 wherein said logic circuitry comprises:
   a first gate having an output coupled to a first input of said writer core; and
   a second gate having an output coupled to a second input of said writer core, said first and second gates adapted to receive said servo write signal and said write current control signal.

3. The controller as recited in claim 1 wherein said logic circuitry receives both inverted and noninverted forms of said servo write signal.

4. The controller as recited in claim 1 wherein said current shunt circuitry comprises first and second shunt transistors.

5. The controller as recited in claim 1 wherein said current shunt circuitry comprises an amplifier for amplifying said write current control signal.

6. The controller as recited in claim 1 wherein said servowriter comprises:
   a constant current device; and
   a switch, coupled to said constant current device, adapted to receive a write enable signal.

7. The controller as recited in claim 1 wherein said writer core and said controller are collocated on a common integrated circuit substrate.

8. For use with a servowriter that includes a writer core having a plurality of transistors that route servowriting current in response to a servo write signal, a method of controlling write transitions, comprising:
   selectively blocking said servo write signal based on a state of a write current control signal; and
   concurrently selectively shunting current around said writer core based on said state.

9. The method as recited in claim 8 wherein said selectively blocking is carried out by logic circuitry comprising:
   a first gate having an output coupled to a first input of said writer core; and
   a second gate having an output coupled to a second input of said writer core, said first and second gates adapted to receive said servo write signal and said write current control signal.

10. The method as recited in claim 8 wherein said selectively blocking comprises receiving both inverted and noninverted forms of said servo write signal.

11. The method as recited in claim 8 wherein said concurrently selectively shunting is carried out by current shunt circuitry comprising first and second shunt transistors.

12. The method as recited in claim 8 wherein said concurrently selectively shunting comprises amplifying said write current control signal.

13. The method as recited in claim 8 wherein said servowriter comprises:
   a constant current device; and
   a switch, coupled to said constant current device, adapted to receive a write enable signal.

14. The method as recited in claim 8 wherein said servowriter is located on an integrated circuit substrate.

15. A magnetic disk drive, comprising:
   a magnetic recording disk;
   a voicecoil read/write head proximate said magnetic recording disk; and
   read/write circuitry, coupled to said voicecoil read/write head and including:
      a servowriter that includes a writer core having a plurality of transistors that route servowriting current in response to a servo write signal,
      logic circuitry, coupled to said writer core, that selectively blocks said servo write signal based on a state of a write current control signal, and
      current shunt circuitry, coupled to said writer core, that operates concurrently with said logic circuitry selectively to shunt current around said writer core based on said state.

16. The magnetic disk drive as recited in claim 15 wherein said logic circuitry comprises:
   a first gate having an output coupled to a first input of said writer core; and
   a second gate having an output coupled to a second input of said writer core, said first and second gates adapted to receive said servo write signal and said write current control signal.

17. The magnetic disk drive as recited in claim 15 wherein said logic circuitry receives both inverted and noninverted forms of said servo write signal.

18. The magnetic disk drive as recited in claim 15 wherein said current shunt circuitry comprises first and second shunt transistors.

19. The magnetic disk drive as recited in claim 15 wherein said current shunt circuitry comprises an amplifier for amplifying said write current control signal.

20. The magnetic disk drive as recited in claim 15 wherein said servowriter comprises:
   a constant current device; and
   a switch, coupled to said constant current device, adapted to receive a write enable signal.

* * * * *